US 6,548,808 B2

(12) United States Patent
Ozawa (10) Patent No.: US 6,548,808 B2
(45) Date of Patent: Apr. 15, 2003

(54) OPTICAL SENSOR HOLDER

(75) Inventor: Ryosuke Ozawa, Daito (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 09/826,091

(22) Filed: Apr. 5, 2001

(65) Prior Publication Data

US 2001/0028040 A1 Oct. 11, 2001

(30) Foreign Application Priority Data

Apr. 5, 2000 (JP) ........................................ 2000-002056

(51) Int. Cl.$^7$ ................................................. H01J 5/02
(52) U.S. Cl. ........................ 250/239; 250/216; 220/837
(58) Field of Search ................................ 250/239, 216, 250/551; 220/525, 530, 531, 833, 834, 837; 257/81, 434, 433

(56) References Cited

U.S. PATENT DOCUMENTS 6,011,254 A * 1/2000 Sana et al. .................. 250/239

FOREIGN PATENT DOCUMENTS

| JP | 7-10502 | 3/1955 |
|----|---------|--------|
| JP | 60-217545 | 10/1985 |
| JP | 4-111019 | 9/1992 |
| JP | 6-11587 | 3/1994 |

\* cited by examiner

*Primary Examiner*—Kevin Pyo
(74) *Attorney, Agent, or Firm*—Crowell & Moring LLP (57) ABSTRACT

An optical sensor holder to detect only the light beam coming through a window by a sensor unit without increasing the number of component parts and without complicated assembling procedure, comprising: an opening to accommodate the photo sensors on its backside; a holder main unit made of synthetic resin and having a window so that the sensor unit faces toward outside at upper portion on front side; a cover unit made of synthetic resin and mountable on the opening to cover the sensor unit; and an arm made of synthetic resin and integrally molded between tip of the holder main unit and tip of the cover unit so that it is flexible and can be bent between tip of the holder main unit and tip of the cover unit, and when it is bent, the cover unit can be moved between the upper portion of the holder main unit and the opening of the holder main unit.

9 Claims, 8 Drawing Sheets

OPTICAL SENSOR HOLDER

BACKGROUND OF THE INVENTION

1. Field of the Invention

The present invention relates to an optical sensor holder for holding an optical sensor at a predetermined position to detect a light beam.

2. Description of the Prior Art

As a conventional type optical sensor holder, an optical sensor holder disclosed in JP-A-60-217545 is known.

In this optical sensor holder, an optical sensor is inserted through an opening formed on backside of the holder, and the sensor unit on the optical sensor is positioned face-to-face to a window so that the sensor unit is exposed to light. By fixing a printed circuit board using screws on the opening on backside of the holder, the incidence of the light into the holder from portions other than the window is prevented.

As another type of optical sensor holder, an optical sensor holder disclosed in Japanese Utility Model 4-111019 Laid-Open is known. In this case, a hood is provided on a window of a holder, and only a light beam entering from the direct front of the tip of the sensor unit can be detected.

In the conventional type optical sensor holders as described above, there have been the following problems:

In case of the former, the printed circuit board must be fixed by screws to prevent the incidence of the light into the holder from portions other than the window. This means that the number the component parts must be increased and complicated assembling procedure is needed.

In case of the latter, no consideration is given on the light beam entering the holder from portions other than the window. If the light beam enters from portions other than the window, the optical sensor may erroneously detect the light.

SUMMARY OF THE INVENTION

It is an object of the present invention to provide an optical sensor holder, in which only the light coming from a predetermined direction can enter and there is no need to increase the number of component parts and to use complicated assembling procedure.

In a concrete arrangement example, the optical sensor holder of the present invention comprises:

a holder main unit made of synthetic resin and having an opening formed on backside thereof where an optical sensor can be inserted, a window where a sensor unit arranged on the optical sensor is faced to outside on upper portion of the front side, a partition plate formed toward backside and for dividing inner space of the holder main unit in lateral direction so that a pair of metal terminals of the optical sensor can be moved away from each other in lateral direction in the holder main unit, a positioning pin projected from inner part of the opening toward backside, and a positioning pin integrally projected from the bottom surface for positioning with respect to a base plate and said positioning pin being inserted into a positioning hole formed on the base plate;

a cover unit made of synthetic resin, having a positioning hole for receiving the positioning pin and mountable on said opening so that the sensor unit can be covered from backside;

an arm made of synthetic resin and integrally molded as bendable between the tip of the holder main unit and the tip of the cover unit; and a leg structure having a pair of leg units extended approximately in parallel and in the same direction to be separated from the holder main unit, having pawls to be engaged with mounting holes formed on the base plate and arranged on forward end thereof to be separated from each other, and said leg units being bendable in directions to be moved closer to each other.

In an essential arrangement of the optical sensor holder, the optical sensor holder comprises:

a holder main unit, having an opening for receiving an optical sensor on backside thereof and a window where a sensor unit provided on the optical sensor is faced to outside on front side;

a cover unit mountable on said opening so that the sensor unit can be covered from backside; and a connection unit for connecting said holder main unit with the cover unit.

In the present invention with the arrangement as described above, the optical sensor is inserted through the opening on the backside of the holder main unit. The sensor unit provided on the optical sensor is positioned face-to-face to a window formed on the holder main unit, and the sensor unit is exposed to the light.

A cover unit connected to the holder main unit via a connection unit is mounted on the opening so that the sensor unit is covered from the backside and the light does not enter the holder main unit from portions other than the window.

As a result, in the optical sensor holder, the light enters only through the window, and the sensor unit detects this incident light. Therefore, there is no possibility that the sensor unit erroneously detects the light entering from portions other than the window.

As explained above, it is possible according to the present invention to provide an optical sensor holder, in which only the light from a predetermined direction can enter, and this means that there is no need to increase the number of component parts and to use complicated assembling procedure.

The holder main unit and the cover unit are connected with each other via the connection unit, and there is no need to have component parts for individual purpose. This means that there is no need to increase the number of component parts and to use complicated procedure to assemble the cover unit with the holder main unit.

As an example of additional arrangement to provide the holder main unit with the optical sensor at a predetermined point, the holder main unit can be also be designed with a leg structure mountable on the base plate.

In the invention with the arrangement as described above, the holder main unit with the optical sensor accommodated in it can be fixed on the base plate by mounting the leg structure on the base plate.

According to the present invention, the arrangement of the holder main unit at a predetermined point can be integrally designed with the holder.

As described above, when the holder main unit is provided with the leg structure, it is convenient because it can be easily mounted on the base plate. However, this is only an example. From the viewpoint that the optical sensor is accommodated in the holder main unit in such manner that the light does not enter from the portions other than the window, it is possible to use a mounting member prepared for each individual purpose or to form a mounting structure on the base plate side. Because the holder main unit of the present invention is not limited to the one fixed on the base plate, it may be fixed on a cabinet.

As an arrangement example of the leg structure, it may be designed in such manner that the leg structure comprises a pair of leg units extended approximately in parallel and in the same direction to be separated from the holder main unit, having pawls to be engaged with mounting holes formed on the base plate and arranged on forward end thereof to be separated from each other, and said leg units being bendable in directions to be moved closer to each other.

In the invention with the arrangement as described above, the pawls are formed on the forward end of a pair of leg units extended approximately in parallel and in the same direction to be separated from each other and arranged on the side to be separated from the holder main unit, and the pawls are pressed against opening edges of the mounting holes formed on the base plate. As a result, the leg units can be inserted into the mounting holes when the leg units are bent to directions to move closer to each other.

When the pawls are inserted into the mounting holes and are projected on opposite surface of the base plate, each of the leg units is restored to the initial position in the directions to be separated from each other, and the pawls are engaged with the opening edges on the opposite side of the mounting holes.

As described above, it is possible according to the present invention to provide the leg structure by merely adding a simple arrangement to the holder main unit.

As an example of additional arrangement of the holder main unit, the invention also provides an optical sensor holder, wherein said holder main unit comprises a positioning pin integrally projected toward extending direction of said leg unit so that positioning can be performed with respect to the base plate, said positioning pin being inserted into a positioning hole formed on said base plate.

In the invention with the arrangement as described above, when the leg units are mounted on the base plate, the positioning pin integrally projected from the bottom surface of the holder main unit to the side where the leg units are extended is inserted into the positioning hole formed on the base plate.

Then, the positioning pin is positioned at a point where the positioning hole is formed, and the positioning of the holder main unit can be achieved.

As described above, it is possible according to the present invention to arrange the holder main unit at any desired point on the base plate.

In an arrangement example of the connection unit, the connection unit has flexibility so that it can be bent toward backside of the holder main unit.

In the invention with the arrangement as described above, the cover unit is connected with the holder main unit via the connection unit which can be bent toward backside of the holder main unit. Thus, in case the optical sensor holder is molded, for instance, it is possible to arrange the holder main unit, the connection unit and the cover unit approximately on the same plane. This is because, when the optical sensor is inserted into the holder main unit, the cover unit can be moved toward backside of the holder main unit and can be mounted on the opening of the holder main unit.

Then, it is possible to simplify the structure of a die to mold the optical sensor holder.

As described above, it is possible according to the present invention to simplify the structure of the die used for the molding of the optical sensor holder.

Also, in case the cover unit is mounted on the opening of the holder main unit, it is possible to have additional arrangement so that the sensor unit can be perfectly covered. As an example, it is arranged in such manner that a positioning pin projected to backside is provided in inner part of the opening of the holder main unit, and that said cover unit comprises a positioning hole where the positioning pin can be inserted to perform positioning.

In the invention with the arrangement as described above, when the cover unit is mounted on the opening of the holder main unit, the positioning pin projected from inner part of the opening of the holder main unit toward backside is passed through the positioning hole formed on the cover unit, and the position of the cover unit is determined.

Then, the position of the cover unit mounted in the opening is deviated and a gap is generated in the opening, and it is possible to prevent the incidence of the light into inner space of the holder main unit through the opening.

Thus, it is possible according to the present invention to perfectly prevent the incidence of the light through the gap formed between the cover unit and the opening of the holder main unit.

Further, the optical sensor usually comprises a pair of metal terminals, and these metal terminals must be accommodated in the holder main unit under the condition where the terminals are insulated from each other. In an additional arrangement to accommodate the metal terminals under the condition where the terminals are insulated from each other, a partition plate for dividing inner space of the holder main unit in lateral direction is formed in backward direction in inner part of the opening of the holder main unit so that a pair of metal terminals provided on the optical sensor can be moved away from each other in lateral direction in inner space of the holder main unit.

In the invention with the arrangement as described above, there is provided a partition plate formed from inner part of the opening of the holder main unit toward backside and to divide inner space of the holder main unit in lateral direction, and a pair of metal terminals are accommodated. Then, it is possible to prevent short-circuiting by separating the metal terminals away from each other in lateral direction of the holder main unit.

As described above, it is possible according to the present invention to accommodate the metal terminals of the optical sensor into the holder main unit under the condition where the metal terminals are insulated from each other.

Other and further objects, features and advantages of the invention will appear more fully from the following description.

BRIEF DESCRIPTION OF THE DRAWINGS

A preferred form of the present invention is illustrated in the accompanying drawings in which.

DESCRIPTION OF THE PREFERRED EMBODIMENT

Description will be given below on embodiments of the present invention referring to the drawings.

Figure 1:
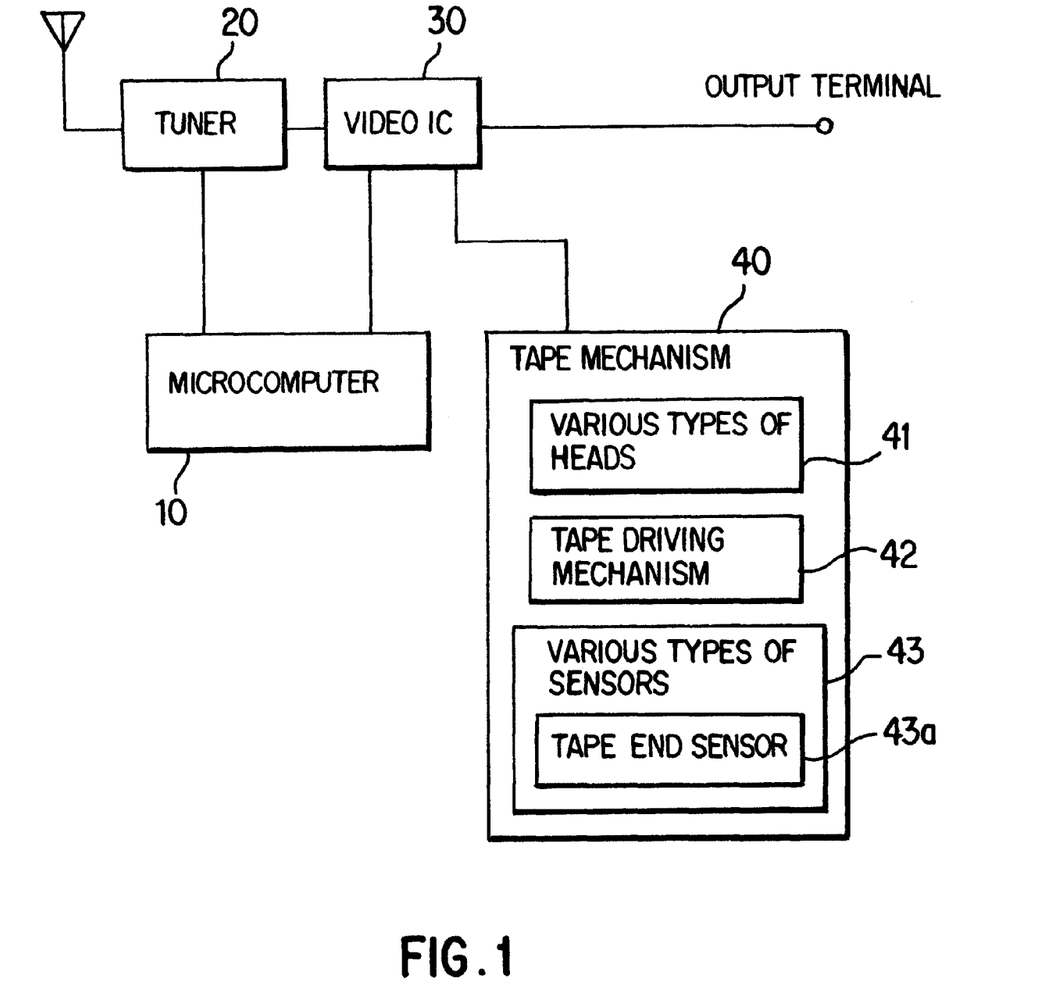
FIG. 1 is a block diagram of an essential arrangement of a video tape recorder according to an embodiment of the present invention.

FIG. 1 is a block diagram of an essential arrangement of a video tape recorder according to an embodiment of the present invention.

As shown in FIG. 1, there is provided a microcomputer 10 with a predetermined program execution environment, and a tuner 20, a video IC 30, and a tape mechanism 40 are connected to the microcomputer 10.

The tuner 20 receives television broadcasting based on a receiving frequency as instructed from the microcomputer 10. Signal processing is performed as predetermined, and a broadcasting signal is outputted to the video IC 30. At the video IC 30, a video signal for recording to video tape is generated according to the broadcasting signal inputted from the tuner 20. Also, an image signal and an audio signal are generated and outputted to an output terminal according to the video signal reproduced from the video tape.

In the tape mechanism 40, there are provided various types of heads 41 for recording and reproducing the video signal to and from the video tape, a tape driving mechanism 42 to drive the video tape, and various types of sensors 43 for detecting running condition of the video tape.

As an example of various types of sensors, a tape end sensor 43a for detecting a starting end and a finishing end of the video tape is provided.

Figure 2:
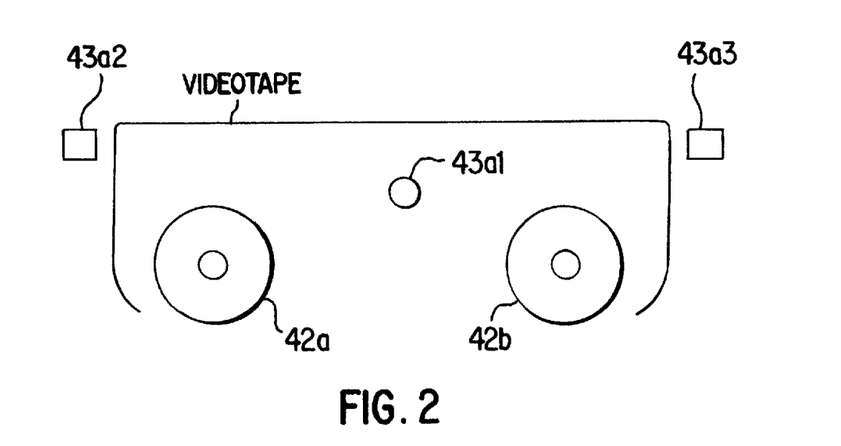
FIG. 2 is a drawing to explain an essential arrangement of a tape end sensor.

Also, as shown in FIG. 2, the tape end sensor 43a comprises a sensor LED 43a1 arranged between reel bases 42a and 42b in the tape driving mechanism 42, a photo sensor 43a2 arranged at opposite side to the sensor LED 43a1 via a tape pathway closer to the reel base 42a and serving as a finishing end sensor, and a photo sensor 43a3 arranged at opposite side to the sensor LED 43a1 via a tape pathway closer to the reel base 42b and serving as a starting end sensor. Here, the photo sensors 43a2 and 43a3 make up together an optical sensor according to the present invention.

A transparent reader tape is provided at the starting end and the finishing end of the video tape. When the tape reaches the starting end or the finishing end and the reader tape is positioned between the sensor LED 43a1 and the photo sensor 43a2 or between the sensor LED 43a1 and the photo sensor 43a3, a light beam projected from the sensor LED 43a1 passes through the reader tape and reaches the photo sensors 43a2 and 43a3, and the tape end sensors 43a are turned on. The microcomputer 10 detects that the tape end sensors 43a have been turned on and it is judged that the tape end has reached the starting end or the finishing end, and instruction is given to the tape mechanism 40 to stop the running of the video tape.

Figure 3:
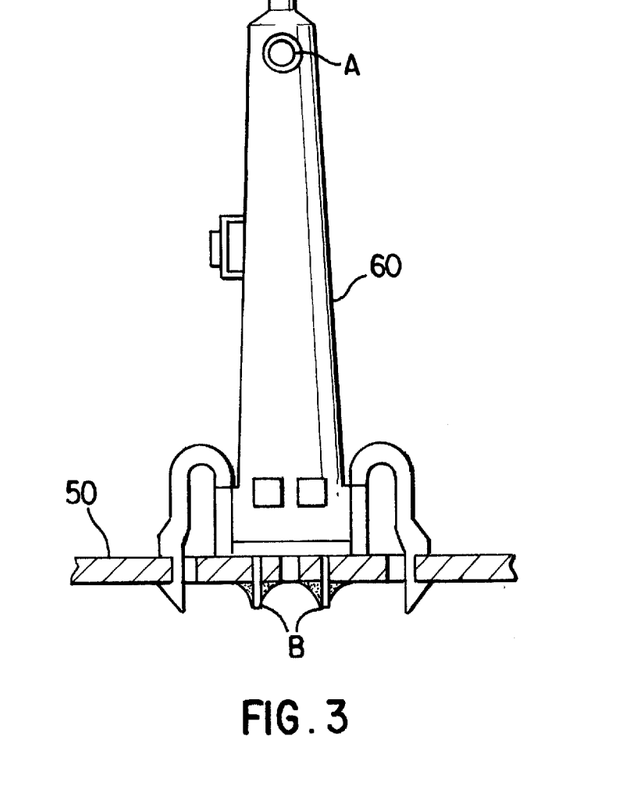
FIG. 3 is a partial cross-sectional view showing a mounting condition of an optical sensor holder to a base plate.

Here, as shown in FIG. 3, the photo sensors 43a2 and 43a3 are accommodated in an optical sensor holder 60 mounted on a base plate 50 with a sensor unit A at a position face-to-face to the sensor LED 43a1. Metal terminals B and B projected toward the base plate 50 are soldered to a printed wiring formed on the base plate.

Figure 4:
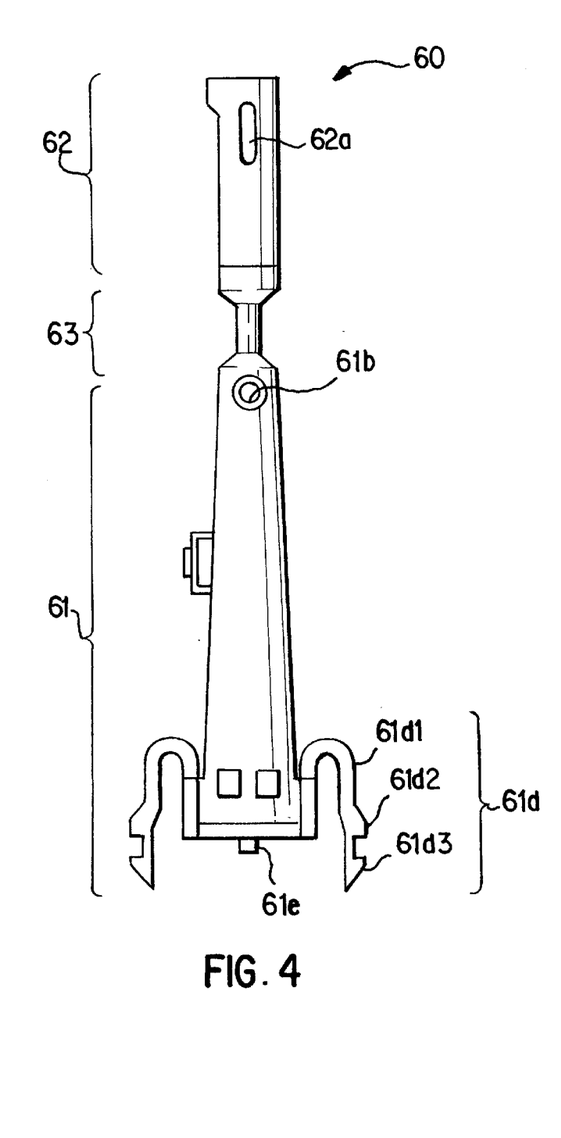
FIG. 4 is a plan view of an arrangement of the optical sensor holder when it is seen from front direction.
Figure 5:
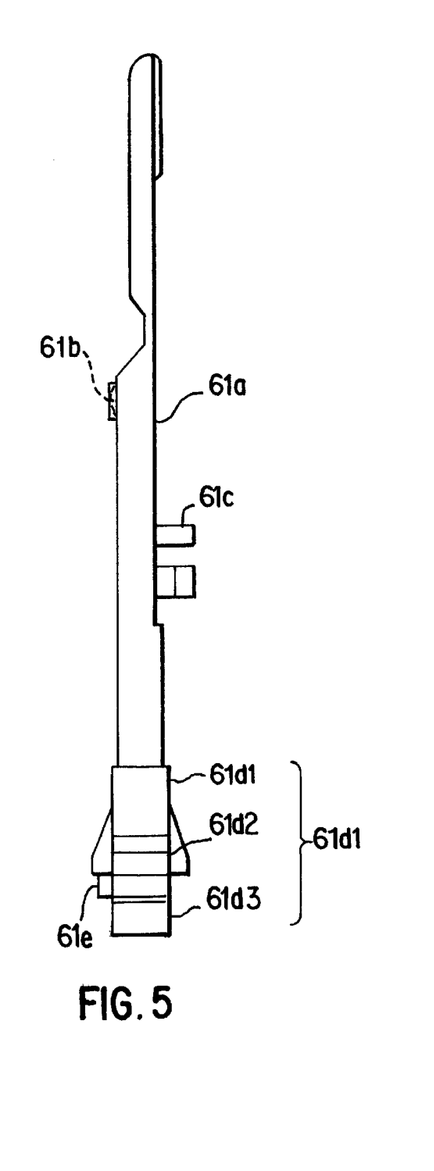
FIG. 5 is a side view of an arrangement of the optical sensor holder when it is seen from lateral direction.
Figure 6:
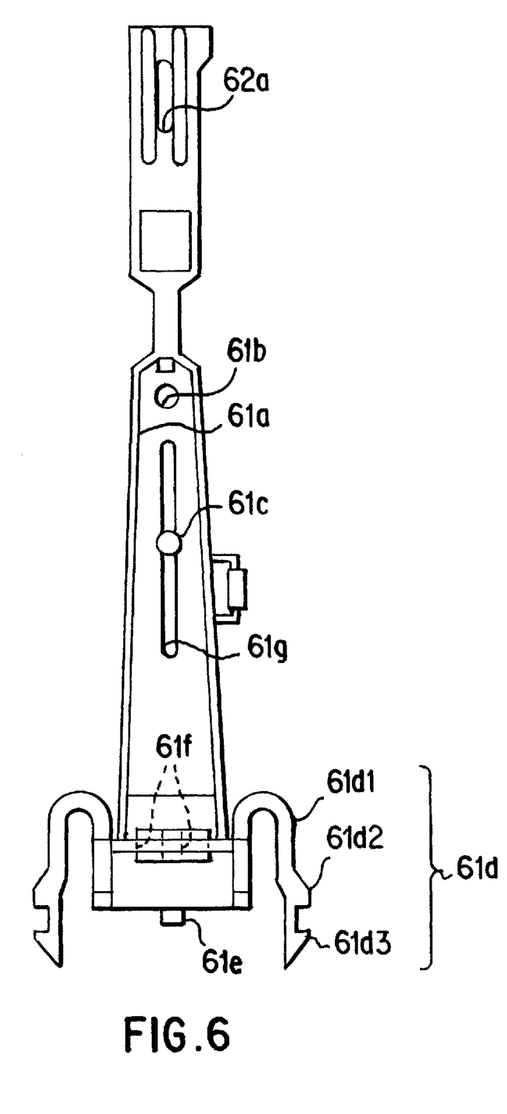
FIG. 6 is a plan view of an arrangement of the optical sensor holder when it is seen from backside.

As shown in FIG. 4 to FIG. 6, the optical sensor holder 60 comprises an opening 61a to accommodate the photo sensors 43a2 and 43a3 on its backside, and it further comprises a holder main unit 61 made of synthetic resin and having a window 61b so that the sensor unit A faces toward outside at upper portion on front side, a cover unit 62 made of synthetic resin and mountable on the opening 61a to cover the sensor unit A, and an arm 63 made of synthetic resin and integrally molded between tip of the holder main unit 61 and tip of the cover unit 62 so that it is flexible and can be bent, and when it is bent, the cover unit 62 can be moved between the upper portion of the holder main unit 61 and the opening 61a of the holder main unit 61. Here, the resin arm 63 makes up a connection unit of the present invention.

Figure 7:
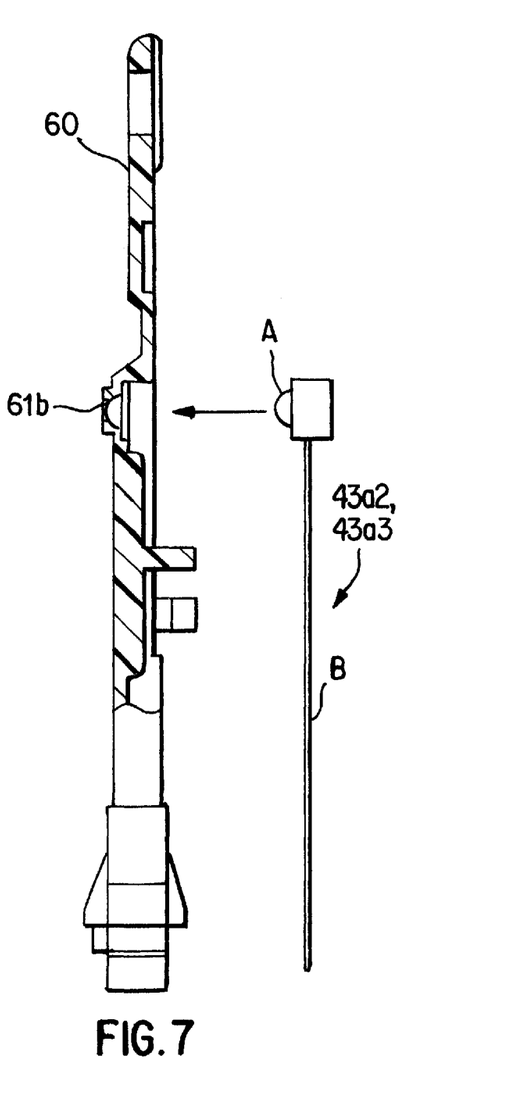
FIG. 7 is a partially cutaway cross-sectional view showing a condition when a photo sensor is accommodated in the optical sensor holder.
Figure 8:
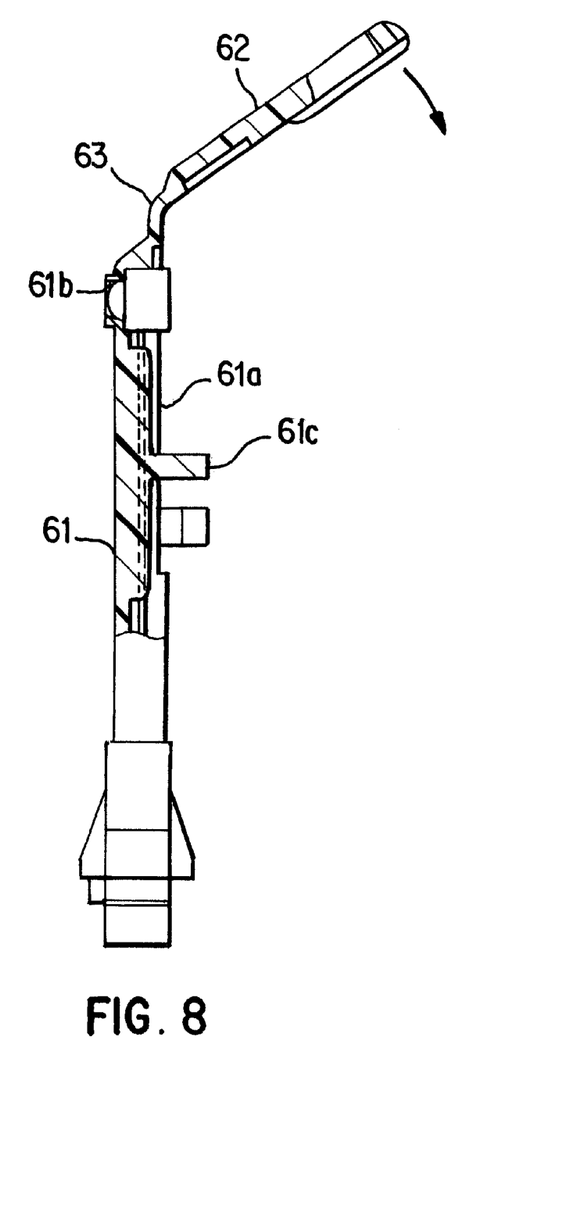
FIG. 8 is a partially cutaway cross-sectional view showing a condition when a cover unit is moved toward an opening of a holder main unit.

With the arrangement as described above, as shown in FIG. 7, the metal terminals B and B are directed in downward direction while the sensor unit A is positioned face-to-face to the window 61b, and the photo sensors 43a2 and 43a3 are accommodated through the opening 61a of the holder main unit 61. As shown in FIG. 8, the cover unit 62 is moved toward the opening 61a of the holder main unit 61 while the resin arm 63 is bent toward the backside of the holder main unit 61.

Figure 9:
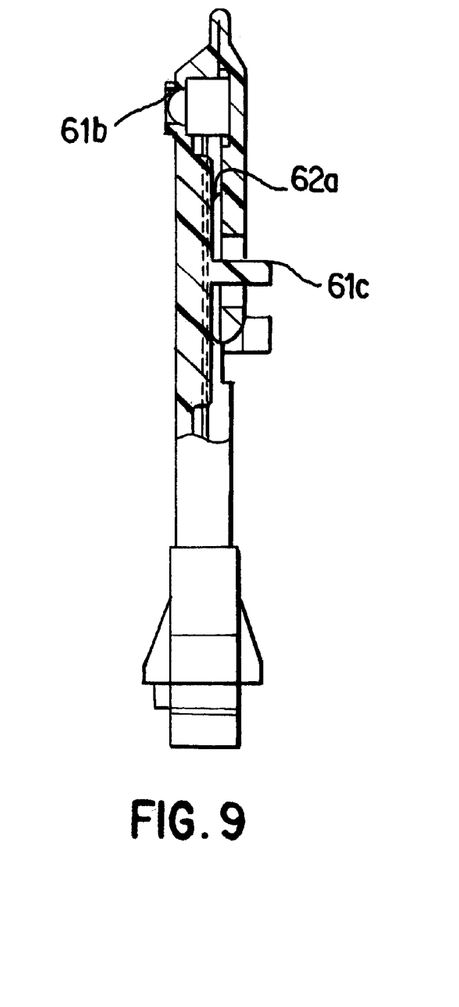
FIG. 9 is a partially cutaway cross-sectional view showing a condition when the cover unit is mounted on the opening of the holder main unit.

A positioning pin 61c is projected in backward direction in inner part of the opening. When the positioning pin 61c is inserted into a positioning hole 62a formed on the cover unit 62 as shown in FIG. 9, the cover unit 62 is mounted on the opening 61a by positioning it to cover the sensor unit A from backside.

As a result, only a light beam entering the holder main unit 61 via the window 61b is detected by the sensor unit A, and no light enters from the backside of the holder main unit 61. Therefore, the light beam projected from the sensor LED 43a1 is reflected by inner wall of the cabinet and it enters the holder main unit 61 from backside, and this prevents erroneous detection of the reflection light by the sensor unit A.

Figure 10:
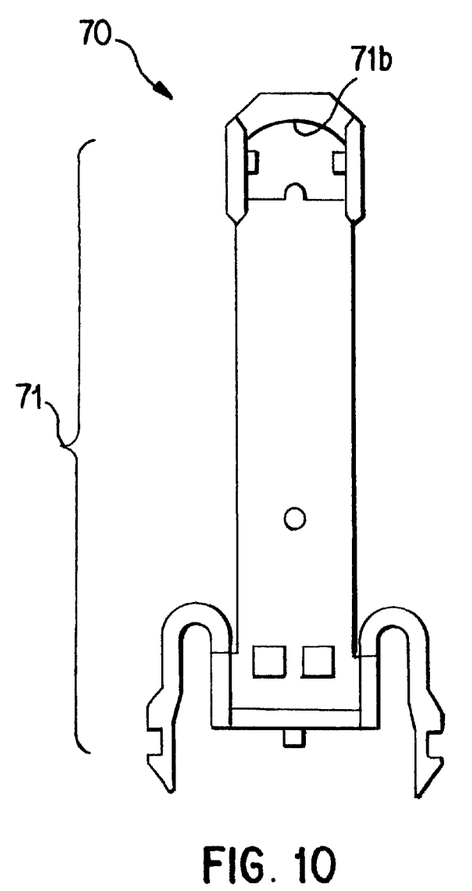
FIG. 10 is a plan view of an arrangement of a conventional type optical sensor holder when it is seen from front direction.
Figure 11:
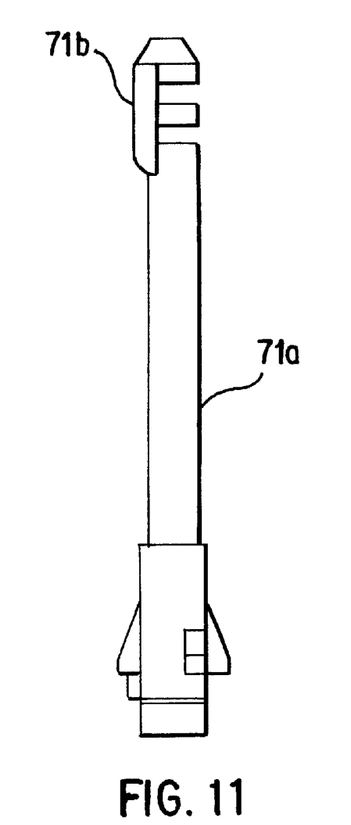
FIG. 11 is a side view of an arrangement of the conventional type optical sensor when it is seen from lateral direction.
Figure 12:
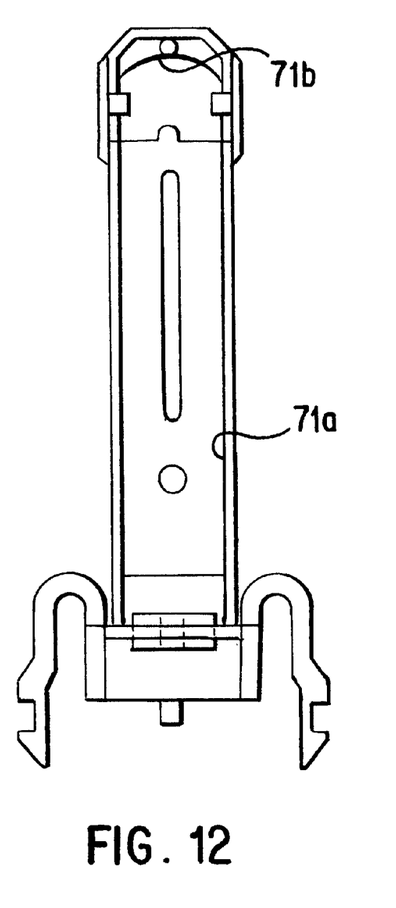
FIG. 12 is a plan view of an arrangement of the conventional type optical sensor holder when it is seen from backside.
Figure 13:
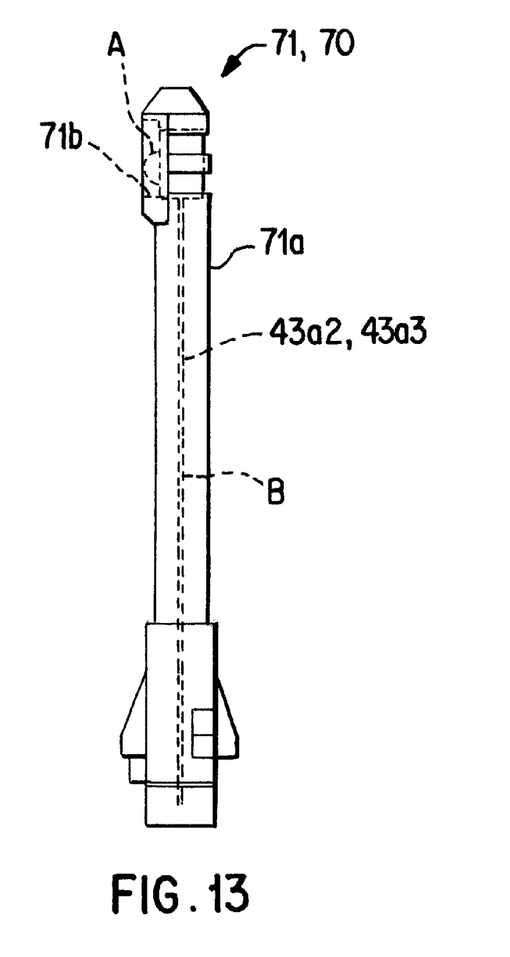
FIG. 13 is a side view showing a condition when a photo sensor is accommodated in the conventional type optical sensor holder.
Figure 14:
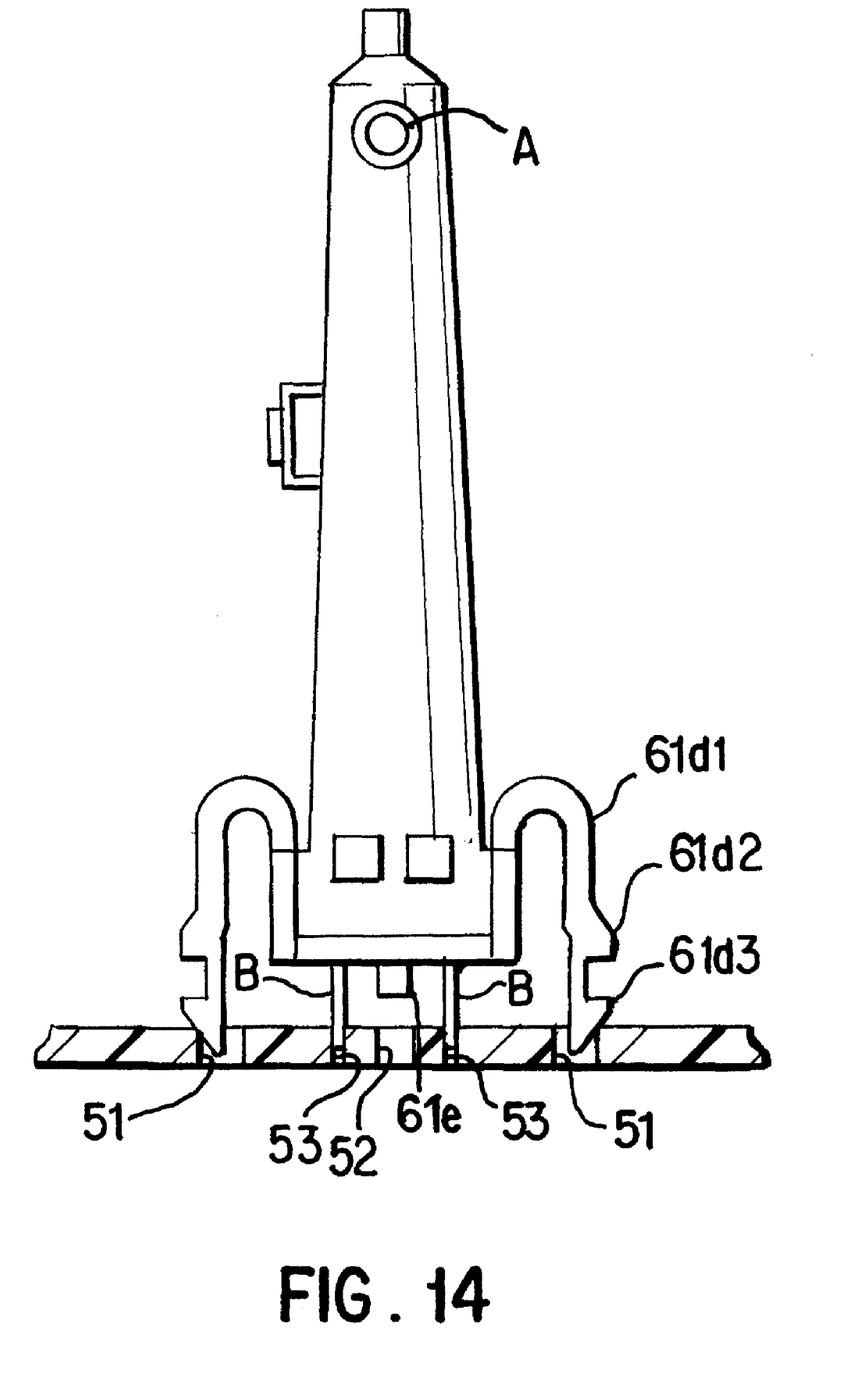
FIG. 14 is a partial cross-sectional view showing a condition when the optical sensor holder is mounted on the base plate.

As shown in FIG. 10 to FIG. 12, a conventional type optical sensor holder 70 comprises an opening 71a to accommodate the photo sensors 43a2 and 43a3 on the backside, and it comprises only a holder main unit 71 made of synthetic resin and having a window 71b, through which the sensor unit A can be exposed from upper portion on the front side. As shown in FIG. 13, when the photo sensors 43a2 and 43a3 are accommodated in the holder main unit 71 with the sensor unit A facing to the window 71b, the backside of the holder main unit 71 is opened.

As a result, a light beam projected from the sensor LED 43a1 is reflected by inner wall of the cabinet and enters the holder main unit 71 from backside, and the sensor A may erroneously detect the reflection light. In the optical sensor holder 6 of the embodiment of the present invention as described above, such erroneous detection can be avoided.

Also, the cover unit 62 to cover the sensor unit A from the backside of the holder main unit is integrally formed with the holder main unit 61 via the resin arm 63. This means that the number of component parts is not increased, and this contributes to the usefulness of the invention.

On the lower portion of the holder main unit 61, a leg structure 61d mountable to the base plate 50 is provided. On the leg structure, a pair of leg units 61d1 and 61d1 are extended approximately in parallel and in the same direction away from the holder main unit 61, and the leg units 61d1 can be bent in directions toward each other. On the forward portion of each of the leg units 61d1, pawls 61d2 and 61d3 are provided so that opening edges of each of mounting holes 51 formed on the base plate 50 can be squeezed in lateral direction of the base plate 50 to move away from each other.

With the arrangement as described above, the pawls 61d3 are pressed against the opening edges of the mounting hole 51 and are bent in directions to come closer to each other, and the leg unit 61d1 is inserted into the mounting hole 51 until the bottom surface comes into contact with the upper surface of the base plate 50. When the pawls 61d3 formed on each of the leg units 61d1 are fully projected on opposite surface of the base plate 50, the leg units 61d1 and 61d1 are restored to the initial position so that these are moved away from each other. Thus, the pawls 61d2 and 61d3 squeeze the opening edges of the mounting hole 51 in lateral direction of the base plate 50.

In this case, a positioning pin 61e projected downward from the bottom surface of the holder main unit 61 is inserted into a positioning hole 52 formed on the base plate 50 as shown in FIG. 3, and positioning of the holder main unit 61 is performed at the same time. When the photo sensors 43a2 and 43a3 are accommodated in the holder main unit 61, the lower ends of the metal terminals B and B are projected downward from the bottom surface of the holder main unit 61. As a result, the projecting metal terminals B and B are inserted into terminal mounting holes 53 and 53 respectively on the base plate 50 and are soldered on the lower surface of the base plate 50.

As shown in FIG. 6, terminal positioning holes 61f and 61f are provided so that the metal terminals B and B can be inserted. When the photo sensors 43a2 and 43a3 are accommodated in the holder main unit 61, the position of the lower end of each of the metal terminals B and B projecting downward can be determined by inserting the metal terminals B and B into the terminal positioning holes 61f and 61f respectively. Further, a partition plate 61g for dividing inner space of the holder main unit 61 is provided in lateral direction toward backside inside the opening 61a. Because the metal terminals B and B are arranged with the partition plate 61g between them, short-circuiting can be avoided.

Next, description will be given on the procedure when the photo sensors 43a2 and 43a3 are accommodated in the optical sensor holder 60 of the present embodiment and are mounted on the base plate 50.

A worker inserts the lower end of each of the metal terminals B and B into the terminal positioning holes 61f and 61f respectively while the metal terminals B and B are arranged with the partitioning plate 61g between them. Then, the photo sensors 43a2 and 43a3 are accommodated in the holder main unit 61 through the opening 61a.

The cover unit 62 is pushed down toward the opening 61a, and the resin arm 63 is bent toward the backside. The positioning pin 61c is passed through the positioning hole 62a for positioning of the cover unit 62, and the cover unit 62 is mounted on the opening 61a.

After the photo sensors 43a2 and 43a3 have been accommodated in the holder main unit 61, the holder main unit 61 is mounted on the base plate 50.

Specifically, the positioning pin 61e is inserted into the positioning hole 52 and the positioning of the holder main unit 61 is performed. The pawls 61d2 and 61d3 are pressed against opening edges of the mounting holes 51 and are bent in directions to move closer to each other, and the leg units 61d1 are inserted into the mounting holes 51 until the bottom surface comes into contact with the upper surface of the base plate 50. Then, the pawls 61d2 and 61d3 on the leg units 61d1 squeeze the opening edges of the mounting holes 51 in lateral direction of the base plate 50.

In this case, the metal terminals B and B projecting from the lower end of the holder main unit 61 are inserted into the terminal mounting holes 53 and 53 and are soldered on the lower surface of the base plate 50.

As described above, according to the present invention, the optical sensor holder 60 comprises an opening 61a to accommodate the photo sensors 43a2 and 43a3 on its backside. And it further comprises a holder main unit 61 made of synthetic resin and having a window 61b so that the sensor unit A faces toward outside at upper portion on front side, a cover unit 62 made of synthetic resin and mountable on the opening 61a to cover the sensor unit A, and an arm 63 made of synthetic resin and integrally molded between tip of the holder main unit 61 and tip of the cover unit 62 so that it is flexible and can be bent, and when it is bent, the cover unit 62 can be moved between the upper portion of the holder main unit 61 and the opening 61a of the holder main unit 61. As a result, there is no need to increase component parts or to use complicated assembling procedure, and it is possible to detect only the light beam coming through the window 61b by the sensor unit A.

The foregoing invention has been described in terms of preferred embodiments. However, those skilled, in the art will recognize that many variations of such embodiments exist. Such variations are intended to be within the scope of the present invention and the appended claims.

I claim:

1. An optical sensor holder, comprising:
   a holder main unit made of synthetic resin and having an opening formed on a backside thereof through which an optical sensor is insertable, a window where a sensor unit arranged on the optical sensor faces outward on an upper portion of a front side of the holder main unit, a partition plate is formed toward the backside and divides an inner space of the holder main unit in a lateral direction so that a pair of metal terminals of the optical sensor are moveable away from each other in the lateral direction in the holder main unit, a first positioning pin projects from the second inner space of the opening toward the backside, and a second positioning pin integrally projects from a bottom surface for positioning the holder with respect to a base plate, the second positioning pin being insertable into a positioning hole formed on the base plate;
   a cover unit made of synthetic resin, having a first positioning hole for receiving the first positioning pin and being mountable on said opening so that the sensor unit, is covered from the backside;
   an arm made of synthetic resin integrally molded so as to extend between the main unit and the cover unit, the arm being bendable between a tip of the holder main unit and a tip of the cover unit; and
   a leg structure having a pair of leg units extending approximately in parallel and in a same direction to be separated from the holder main unit, having pawls engageable with mounting holes formed on the base plate and being arranged on forward ends of the leg units so as to be separated from each other, and said leg units being bendable toward one another.

2. An optical sensor holder, comprising:

a holder main unit, having an opening for receiving an optical sensor on a backside thereof and having a window on a front side of the holder main unit to allow a sensor unit provided on the optical sensor to face out of the front side;

a cover unit mountable on said opening so that the sensor unit is covered from the backside; and a connection unit extending between, and integrally formed with, both the holder main unit and cover unit for connecting said holder main unit with the cover unit; wherein the connection unit is made of a bendable material to allow the cover unit to be bent over in order to close the opening of the holder main unit and wherein the main unit having the opening on the back side thereof has an elongated shape, and wherein the cover unit covers approximately half of the backside opening in which the sensor unit is arranged facing the window.

3. An optical sensor holder according to claim 2, wherein said holder main unit comprises a leg structure which, in use, is mountable on a base plate.

4. An optical sensor holder according to claim 3, wherein said leg structure comprises a pair of leg units extended approximately in parallel and in the same direction to be separated from the holder main unit, having pawls to be engaged with mounting holes formed on the base plate and arranged on forward end thereof to be separated from each other, and said leg units being bendable in directions to be moved closer to each other.

5. An optical sensor holder according to claim 4, wherein said holder main unit comprises a positioning pin integrally projected toward extending direction of said leg unit so that the main unit is positionable with respect to the base plate, and said positioning pin being inserted into a positioning hole formed on said base plate.

6. An optical sensor holder according to claim 2, wherein said connection unit has flexibility so that it is bendable toward backside of the holder main unit.

7. An optical sensor holder according to claim 2, wherein:

a positioning pin projected to backside is provided in inner part of the opening of the holder main unit; and said cover unit comprises a positioning hole where the positioning pin is insertable to perform positioning.

8. An optical sensor holder according to claim 2, wherein a partition plate for dividing inner space of the holder main unit in lateral direction is formed in backward direction in inner part of the opening of the holder main unit so that a pair of metal terminals provided on the optical sensor is movable away from each other in lateral direction in inner space of the holder main unit.

9. An optical sensor holder according to claim 1, wherein the holder main unit having the opening on the back side thereof has an elongated shape, and wherein the cover unit covers approximately half of the backside opening in which the sensor unit is arranged facing the window.

* * * * *